US006744041B2

(12) United States Patent
Sheehan et al.

(10) Patent No.: US 6,744,041 B2
(45) Date of Patent: Jun. 1, 2004

(54) APPARATUS AND METHOD FOR FOCUSING IONS AND CHARGED PARTICLES AT ATMOSPHERIC PRESSURE

(76) Inventors: Edward W Sheehan, P.O. Box 111384, Pittsburgh, PA (US) 15238; Ross C Willoughby, P.O. Box 111384, Pittsburgh, PA (US) 15238

( * ) Notice: Subject to any disclaimer, the term of this patent is extended or adjusted under 35 U.S.C. 154(b) by 206 days.

(21) Appl. No.: 09/877,167

(22) Filed: Jun. 8, 2001

(65) Prior Publication Data

US 2002/0011560 A1 Jan. 31, 2002

Related U.S. Application Data

(60) Provisional application No. 60/210,877, filed on Jun. 9, 2000.

(51) Int. Cl.[7] .......................... B01D 59/44; H01J 49/00

(52) U.S. Cl. ...................................... 250/283; 250/294

(58) Field of Search ................................ 250/283, 288, 250/294, 398, 400, 281, 282, 285, 306, 307

(56) References Cited

U.S. PATENT DOCUMENTS

| | | | | |
|---|---|---|---|---|
| 4,209,696 A | | 6/1980 | Fite | 250/288 |
| 4,531,056 A | | 7/1985 | Labowsky et al. | 250/288 |
| 4,542,293 A | | 9/1985 | Fenn et al. | 250/288 |
| 4,999,492 A | | 3/1991 | Nakagawa | 258/281 |
| 5,306,910 A | * | 4/1994 | Jarrell et al. | 250/286 |
| 5,412,208 A | | 5/1995 | Covey et al. | 250/288 |
| 5,436,446 A | | 7/1995 | Jarrell et al. | 250/288 |
| 5,559,326 A | | 9/1996 | Goodley et al. | 250/288 |
| 5,581,081 A | * | 12/1996 | Kato et al. | 250/288 |
| 5,747,799 A | | 5/1998 | Franzen | 250/288 |
| 5,756,994 A | | 5/1998 | Bajic | 250/288 |
| 6,060,705 A | | 5/2000 | Whitehouse et al. | 250/288 |
| 6,207,954 B1 | | 3/2001 | Andrien et al. | 250/288 |
| 6,239,428 B1 | | 5/2001 | Kunz | 250/287 |
| 6,465,776 B1 | * | 10/2002 | Moini et al. | 250/285 |

FOREIGN PATENT DOCUMENTS

| | | |
|---|---|---|
| JP | 04215329 | 8/1992 |
| JP | 10088798 | 4/1998 |
| WO | 99/63576 | 12/1998 |

* cited by examiner

*Primary Examiner*—Hai Pham

(57) ABSTRACT

Improvements have been made for collection and focusing of ions generated from atmospheric pressure sources such as electrospray, atmospheric pressure chemical ionization, inductively coupled plasma, discharge, photoionization and atmospheric pressure matrix assisted laser desorption ionization. A high transmission electro-optical surface is placed between the source regions and the focusing regions to optimize the field geometries and strengths in each respective region. Compression ratios of greater than 5000 are capable of transferring virtually all ions from large volume dispersive ion regions into ion beam cross-sections of less than 1 mm. Embodiments of this invention are methods and devices for improving sensitivity of mass spectrometry when coupled to atmospheric pressure ionization sources.

26 Claims, 11 Drawing Sheets

APPARATUS AND METHOD FOR FOCUSING IONS AND CHARGED PARTICLES AT ATMOSPHERIC PRESSURE

CROSS-REFERENCE TO RELATED APPLICATION

This application claims the benefit of Provisional Patent Application Ser. No. 60/210,877 filed Jun. 9, 2000.

GOVERNMENT SUPPORT

The invention described herein was made in the course of work under a grant from the Department of Health and Human Services, Grant Number: 1 R43 RR143396-1.

BACKGROUND

1. Field of Invention

This invention relates to methods and devices for improved collection and focusing of ions generated at atmospheric pressure for introduction into the mass spectrometer and other particle detectors.

2. Description of Prior Art

The generation of ions at atmospheric pressure is accomplished by a variety of means; including, electrospray (ES), atmospheric pressure chemical ionization (APCI), atmospheric pressure matrix assisted laser desorption ionization (MALDI), discharge ionization, $^{63}$Ni sources, inductively coupled plasma ionization, and photoionization. A general characteristic of all atmospheric sources is the dispersive nature of the ions once produced. Needle sources such as electrospray and APCI disperse ions radially from the axis in high electric fields emanating from needle tips. Aerosol techniques disperse ions in the radial flow of gases emanating from tubes and nebulizers. Even desorption techniques such as atmospheric pressure MALDI will disperse ions in a solid angle from a surface. The radial cross-section of many dispersive sources can be as large as 5 or 10 centimeters in diameter. As a consequence of a wide variety of dispersive processes, efficient sampling of ions from atmospheric pressure sources to small cross-sectional targets or through small cross-sectional apertures and tubes (usually less than 1 mm) into a mass spectrometer becomes quite problematic. This is particularly amplified if the source on ions is removed from the regions directly adjacent to the aperture.

The simplest approach to sampling dispersive atmospheric sources is to position the source on axis with a sampling aperture or tube. The sampling efficiency of simple plate apertures is generally less than 1 ion in $10^4$. Devices developed by Fite (U.S. Pat. No. 4,209,696) used pinhole apertures in plates with electrospray. Devices developed by Laiko and Burlingame (WO 99/63576) used aperture plates with atmospheric pressure MALDI. An atmospheric pressure source by Kazuaki et al (JP04215329) is also representative of this inefficient approach. This general approach in severely restricted by the need for precise aperture alignment and source positioning and very poor sampling efficiency.

A wide variety of source configurations utilize conical skimmer apertures in order to improve collection efficiency over planar devices. This approach to focusing ions from atmospheric sources is limited by the acceptance angle of the field generated by the cone. Generally, source position relative to the cone is also critical to performance, although somewhat better than planar apertures. Conical apertures are the primary inlet geometry for commercial ICP/MS with closely coupled and axially aligned torches. Examples of conical-shaped apertures are prevalent in ES and APCI (U.S. Pat. No. 5,756,994), and ICP (U.S. Pat. No. 4,999,492) inlets. As with planar apertures, source positioning relative to the aperture is critical to performance and collection efficiency is quite low.

One focusing alternative utilizes a plate lens with a large hole in front of an aperture plate or tube for transferring sample into the vacuum system. The aperture plate is generally held at a high potential difference relative to the plate lens. The configuration creates a potential well that penetrates into the source region and has a significant improvement in collection efficiency relative to the plate or cone apertures. This configuration has a clear disadvantage in that the potential well resulting from the field penetration is not independent of ion source position, or potential. High voltage needles can diminish this well. Off-axis sources can affect the shape and collection efficiency of the well. Optimal positions are highly dependent upon both flow (gas and liquid) and voltages. They are reasonable well suited for small volume sources such as nanospray. Larger flow sources become less efficient and problematic. Because this geometry is generally preferential over plates and cones, it is seen in most types of atmospheric source designs. We will call this approach the "Plate-well" design which is reported with apertures by Labowsky et al. (U.S. Pat. No. 4,531,056), Covey et al. (U.S. Pat. No. 5,412,209) and Franzen (U.S. Pat. No. 5,747,799). There are also many Plate-well designs with tubes reported by Fenn et al. (U.S. Pat. No. 4,542,293), Goodley et al. (U.S. Pat. No. 5,559,326), and Whitehouse et al. (U.S. Pat. No. 6,060,705).

Several embodiments of atmospheric pressure sources have incorporated grids in order to control the sampling. Jarrell and Tomany (U.S. Pat. No. 5,436,446) utililized a grid that reflected lower mass ions into a collection cone and passed large particles through the grid. This modulated system was intended to allow grounded needles and float the grid at high alternating potentials. This device had limitations with duty cycle of ion collection in a modulating field (non-continuous sample introduction) and spacial and positioning restrictions relative to the sampling aperture. Andrien et al (U.S. Pat. No. 6,207,954 B1) used grids as counter electrodes for multiple corona discharge sources configured in geometries and at potentials to generated ions of opposite charge and monitor their interactions and reactions. This specialized reaction source was not configured with high field ratios across the grids and was not intended for high transmission and collection, rather for generation of very specific reactant ions. An alternative atmospheric pressure device by Yoshiaki (JP10088798) utilized hemispherical grids in the second stage of pressure reduction. Although the approach is similar to the present device in concept, it is severely limited by gas discharge that may occur at low pressures if higher voltages are applied to the electrodes and most of the ions are lost at the cone-aperture from atmospheric pressure into the first pumping stage.

Grids are also commonly utilized for sampling ions from atmospheric ion sources utilized in ion mobility spectrometry (IMS). Generally, for IMS analysis ions are pulsed through grids down a drift tube to a detector as shown in Kunz (U.S. Pat. No. 6,239,428B1). Great effort is made to create planar plug of ions in order to maximize resolution of components in the mobility spectrum. These devices generally are not continuous, nor do they require focusing at extremely high compression ratios.

SUMMARY

A preferred embodiment of the invention is the configuration of a High Transmission Element (HTE) comprising a conducting meshed-surface in the shape of a partial hemisphere. The HTE is configured downstream from any of a variety of atmospheric pressure sources and upstream from an Inner Field-shaping Electrode and a conducting collector surface (aperture plate or tube). Ions generated in a relatively large volumetric area of an atmospheric pressure source are attracted toward the HTE by an attracting potential relative to the source region.

The field ratio, the field strength on the source side of the high transmission element relative to the collector side is maintained at a lower value (generally 2–10×less) than the field strength equidistant to the collector side of the HTE. In this operating condition, the field from the collector side of the HTE penetrates into the source side of the HTE and accelerates appreciably all of the ions through the openings in the HTE surface. Typically the field ratio value is calculated at a distance of several opening diameters away from the surface. A good value of a field ratio is greater than 10.

The HTE is typically manufactured so to allow ions to pass easily through the HTE surface. This entails having a HTE with a low depth aspect ratio, referring to the ratio of the dimension of the openings to the thickness of the HTE surface; where the thickness of the element is as thin as mechanically possible. In addition, the openness of the HTE is also important. Typically the openness, the ratio of the dimension of the opening to the entire surface area should be as large as possible to allow the field from the collector side to penetrate through the HTE into the source side several opening diameters away from the surface of HTE.

The HTE and the inner field-shaping electrode are held at approximately the same potential relative to the collector surface which is held at extremely high potential difference to attract virtually all ions that cross the HTE, through a relatively large aperture in the inner field-shaping electrode, onto the collector surface (or through an aperture into the vacuum). The combination of HTE shape, Inner Field-shaping Electrode aperture size, and potential difference (between the HTE and the collector) affect substantial compression of the dispersed ions into a small cross-sectional beam at the collector. When this beam is precisely aligned with a vacuum sampling aperture into a mass spectrometer, very high sensitivities are achieved.

The physical separation of ionization source region from the deep potential-well focusing region by the HTE solves many of the efficiency problems associated with conventional approaches to ion collection at atmospheric pressure. With the present invention, dispersed ions are not required to be focused to a small diameter in the ion source region, rather, they are required to drift toward a relatively large surface of the HTE. In this way all ions from a given source can be collected across an appropriately sized and shaped HTE surface, then focused in the high field of the focusing well.

One advantage of the present device is the independence of collection efficiency from source position. Multiple sources are able to be uniformly collected with this invention. Multiple focal points can also be configured if there is need to collect part of the sample and analyze another part.

A primary object of the invention is to collect all the ions, all the time.

OBJECTS AND ADVANTAGES

One object of the present invention is to increase the collection efficiency of an ions and/or charged particles at a collector, or through an aperture or tube into a vacuum system, by creating a very small cross-sectional area beam of ions and/or charged particles from highly dispersed atmospheric pressure ion sources. Another object of the present invention is to increase the transmission efficiency of ions from atmospheric pressure ion sources to a target collector, or through an aperture or tube. The present invention has a significant advantage over prior art in that the use of a High Transmission Element to separate ion generation from ion focusing allows precise shaping of fields in both regions. Ions can be generated in large ion source regions without losses to walls. Droplets have longer time to evaporate and/or desorb ions without loss from the sampling stream. Source temperatures can be lower because rapid evaporation is not required. This can prevent thermal decomposition of some labile compounds. Counter electrodes for electrospray needles do not have to be the plate lens as practices with most convention sources or even the HTE. The aerosol can be generated remotely and ions can be allowed to drift toward the HTE.

Another object of the present invention is to have collection efficiency be independent of ion source position relative to the collection well. With the present invention there is no need for precise mechanical needle alignment or positioning relative to collectors, apertures, or tubes invention. Ions generated any at position in the ion source region are transmitted to the collector, aperture, or tube with similar efficiency. No existing technology has positional independence of the source. The precise and constant geometry, and alignment of the focusing well with sampling apertures will not change with needle placement. The fields inside (focusing side) the well will not change, even if they change outside (source side).

Another object of the present invention is the independence of ion source type. This device is capable of transmission and collection of ions from any atmospheric (or near atmospheric) source; including, electrospray, atmospheric pressure chemical ionization, atmospheric pressure MALDI (laser desorption), inductively coupled plasma, discharge sources, nickel 63 sources, spray ionization sources, induction ionization sources and photoionization sources. The device is also capable of sampling ions of only one polarity at a time, but with extremely high efficiency.

Another object of the present invention is to efficiently collect and/or divert a flow of ions from more than one source. This can be performed in a simultaneous fashion for introduction of mass calibrants from a separate source and analytes from a different source; conversely, it can be performed sequentially as is typical with multiplexing of multiple chromatographic streams introduced into one mass spectrometer.

Another object of the present invention is to efficiently transmit ions to more than one target position. This would have the utility of allowing part of the sample to be collected on a surface while another part of the sample is being introduced through an aperture into a mass spectrometer to be analyzed.

Another object of the present invention is to improve the efficiency of multiplexed inlets from both multiple macroscopic sources and micro-chip arrays, particularly those developed with multiple needle arrays for electrospray. Position independence of this invention make it compatible with a wide variety of needle array technologies and multi-well plates for surface desorption techniques.

Another object of the present invention is to remove larger droplets and particles from aerosol sources with a counter-flow of gas to prevent contamination of apertures, tubes, and vacuum components.

DRAWING FIGURES

In the drawings, closely related figures have the same number but different alphabetic suffixes.

FIGS. 1 are cross-sectional illustrations of hemispherical-shaped high transmission element configurations with three alternative target collector elements; namely, (A) the target collector elements configured with an aperture into a vacuum system, (B) the target collector element configured with a tube inlet to a vacuum system, and (C) the target collector element configured with an aperture directed toward a non-vacuum ion sample collector plate.

REFERENCE NUMBERS IN DRAWINGS

| | | | |
|---|---|---|---|
| 20 | laser beam | 40 | high transmission element |
| 21a | first liquid inlet | 41 | holes or apertures |
| 21b | second liquid inlet | 42 | ring insulator |
| 22a | first MALDI sample | 42a | ring insulator |
| 22b | second MALDI sample | 42b | ring insulator |
| 23a | first electrospray liquid cone-jet | 44 | inner field shaping electrode |
| 23b | second electrospray liquid cone-jet | 44a | inner field shaping electrode |
| 24 | MALDI sample plate | 44b | inner field shaping electrode |
| 25 | electrospray needle array | | |
| 30 | ion source region | | |
| 30a | first ion source region | 46 | ring insulator |
| 30b | second ion source region | 46a | first ring insulator |
| 32 | ion collection region | 46b | second ring insulator |
| 32a | first ion collection region | 48a | first insulator |
| 32b | second ion collection region | 48b | second insulator |
| 34 | ion trajectory lines | 50 | ion focusing-steering region |
| 36 | outer field shaping electrode | 50a | first ion focusing-steering region |
| 52 | gas supply line | | |
| 56 | equipotential lines | 50b | second ion focusing-steering region |
| 70 | insulated tube or capillary | | |
| 72 | rotating switch | 86c | inner field-shaping electrode aperture |
| 74 | isolation plate | | |
| 76 | axial valve aperture | 86d | inner field-shaping electrode aperture |
| 78 | off-axis valve aperture | | |

-continued

| | | | |
|---|---|---|---|
| 80 | target collector element | 86e | inner field-shaping electrode aperture |
| 81 | electrode | | |
| 80a | first target collector element | 86f | inner field-shaping electrode aperture |
| 80b | second target collector element | | |
| 82 | collector surface | 90 | collector region |
| 82a | first off-axis collector element | 90a | first collector region |
| 82b | second off-axis collector element | 90b | second collector region |
| | | 92a | first off-axis collector region |
| 84 | target collection aperture | | |
| 84a | tubular target collection aperture | 92b | second off-axis collector region |
| 86 | inner field-shaping electrode aperture | 94 | collector plate |
| 86a | inner field-shaping electrode aperture | | |
| 86b | inner field-shaping electrode aperture | | |

DESCRIPTION

Figure 1A:
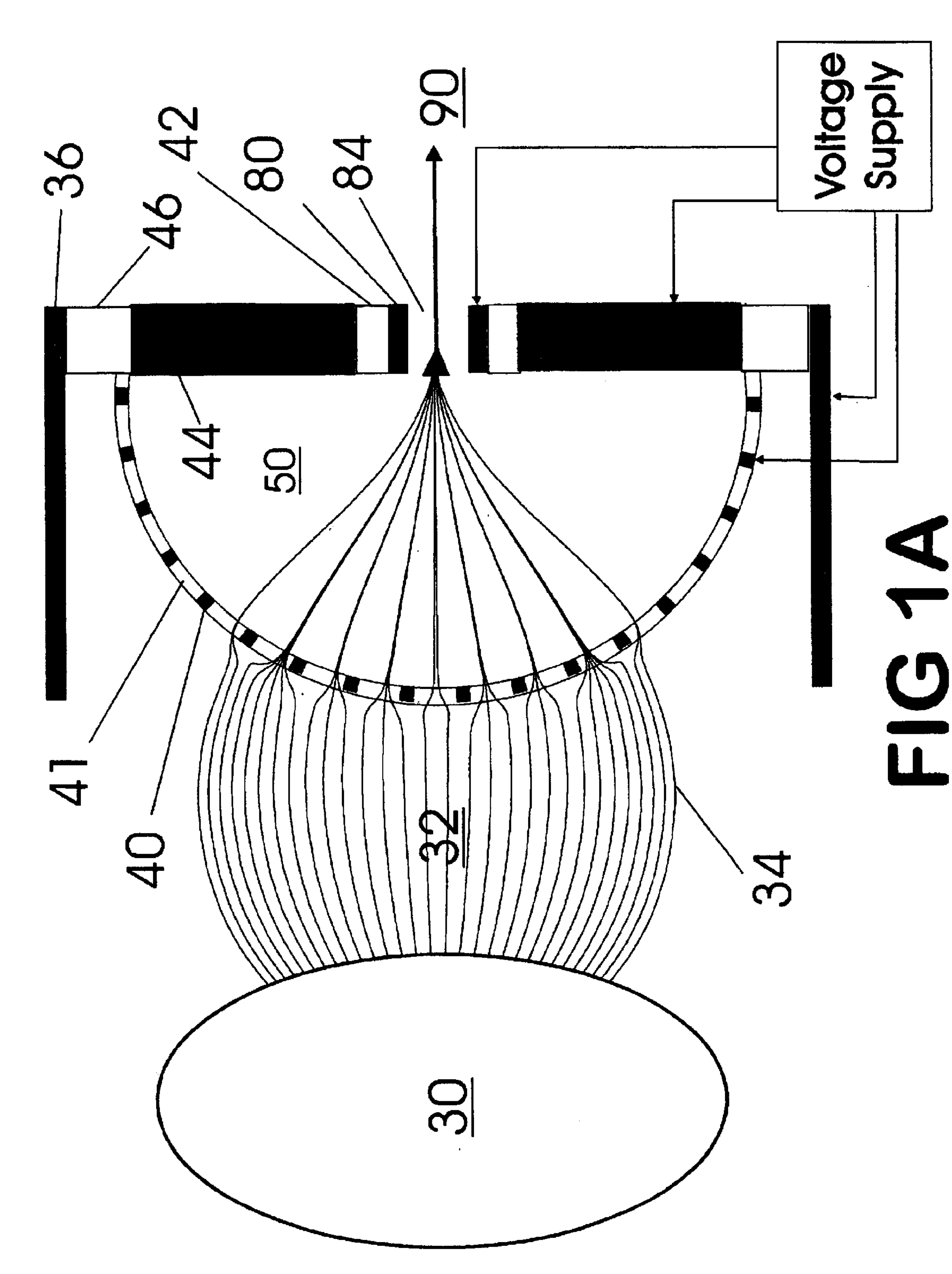
Figure 6A:
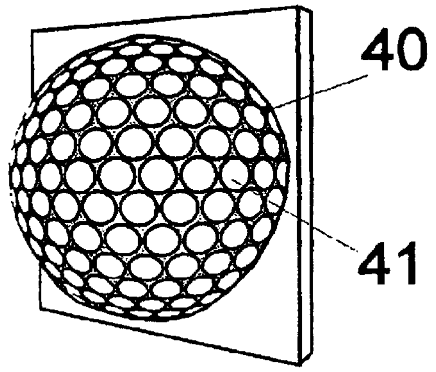
FIGS. 6 show perspective views of six hemispherical shaped high transmission elements; showing (A) circular apertures, (B) woven mesh, (C) criss-cross mesh (D) hexagonal apertures, (E) transverse slots, and (F) radial slots.

Preferred Embodiment— FIGS. 1A and 6A (Basic Focusing Device)

One embodiment of the present invention is an ion or particle focusing device utilizing a high transmission element 40 as illustrated in FIG. 1A. The device includes an atmospheric pressure or near atmospheric pressure ion source region 30 from which ions are supplied to an ion collection region 32. This device is intended for use in collection and focusing of ions from a wide variety of ion sources; including, but not limited to electrospray, atmospheric pressure chemical ionization, photo-ionization, electron ionization, laser desorption (including matrix assisted), inductively coupled plasma, and discharge ionization. Both gas-phase ions and charged particles emanating from region 30 are collected and focused with this device. Ions and charged particles from region 32 move through a high transmission element 40 into an ion focusing-steering region 50. Strong electric fields in region 50 relative to region 32 cause ions in region 32 to traverse element 40 and be focused to a target collector element 80. Movement of ions from region 30 to region 90 is indicated by a set of ion trajectory lines 34. The focused ions at element 80 are transferred to an ion collection region 90 through a target collection aperture 84. Aperture 84 has a diameter appropriate to restrict the flow of gas from region 50 to region 90. In the case of vacuum detection, such as mass spectrometry in region 90, typical aperture diameters are 100 to 500 um. Element 80 is made of a conducting material or a conductively coated insulating material such as glass. The collection region 90 in this embodiment is intended to be the vacuum system of a mass spectrometer (interface stages, optics, analyzer, and detector) or other low-pressure ion and particle detectors. In this embodiment the element 40 has a hemisphere-shaped surface of uniform cross-section (FIG. 6A). It is made of a conductive material, such as stamped sheet metal. Circular-shaped apertures or holes 41 are evenly spaced across element 40. Element 40 is fabricated from a conducting and chemically inert material such as stainless steel. It is also possible to use molded materials that are conducting as well as non-conducting molded materials with subsequent deposition of conducting material on the surface of element 40. An inner field-shaping electrode 44 is a conducting circular plate position between element 40 and 80. Element 40 is electrically separated from electrode 44 by insulating ring 46. Element 80 is electrically separated from electrode 44 by insulating ring 42. An outer field-shaping electrode 36 comprises a conducting cylinder coaxial to and outside of element 40. Electrode 36 is electrically separated from element 40 by insulating ring 46. All elements and electrodes are generally made of chemically inert and conductive materials that may be stamped or machined to conform to the appropriate geometries, such as stainless steel, brass, copper, and aluminum.

Additional Embodiments—FIGS. 1B, 1C, 2A, 2B, 2C—(Alternative Target Collectors, Multiple Sources)

Additional embodiments are shown in FIGS. 1B, 1C, and 2A through 2C, in each case the high transmission element 40 is shown with a hemispherical surface.

Figure 1B:
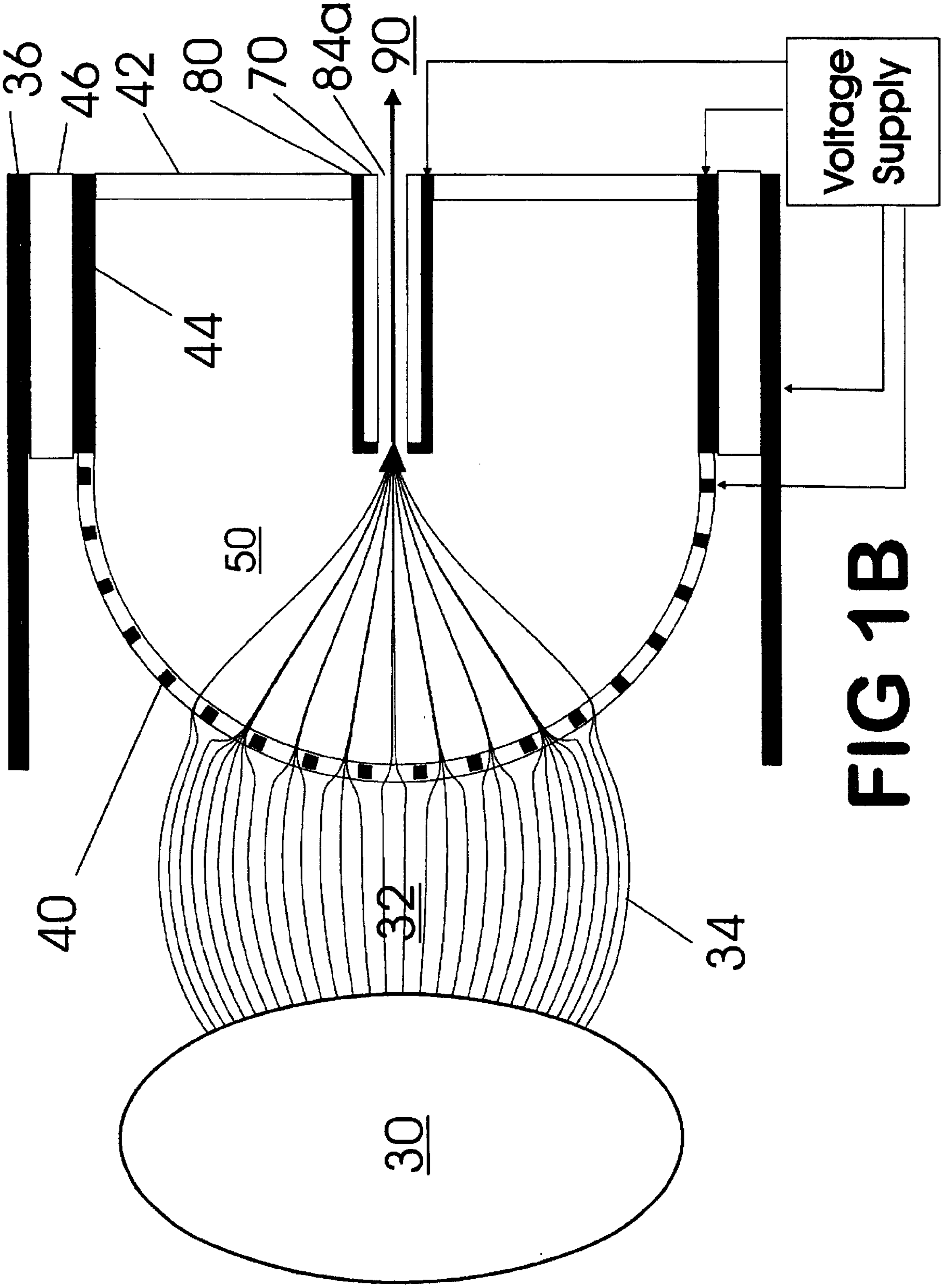

In FIG. 1B the ion and particle focusing device shows a similar arrangement as in FIG. 1A, however the plate-shaped collector electrode 80 is replaced by tube-shaped target collector element 80 which is located on the outside of an electrically insulated tube 70. Flow of ions and particles through tube 70 and tubular target collector aperture 84*a* are similarly transferred to collector region 90. Region 90 is generally the vacuum region of a mass spectrometer or other vacuum detectors. Movement of ions from region 30 to region 90 is indicated by a set of ion trajectory lines 34.

Figure 1C:
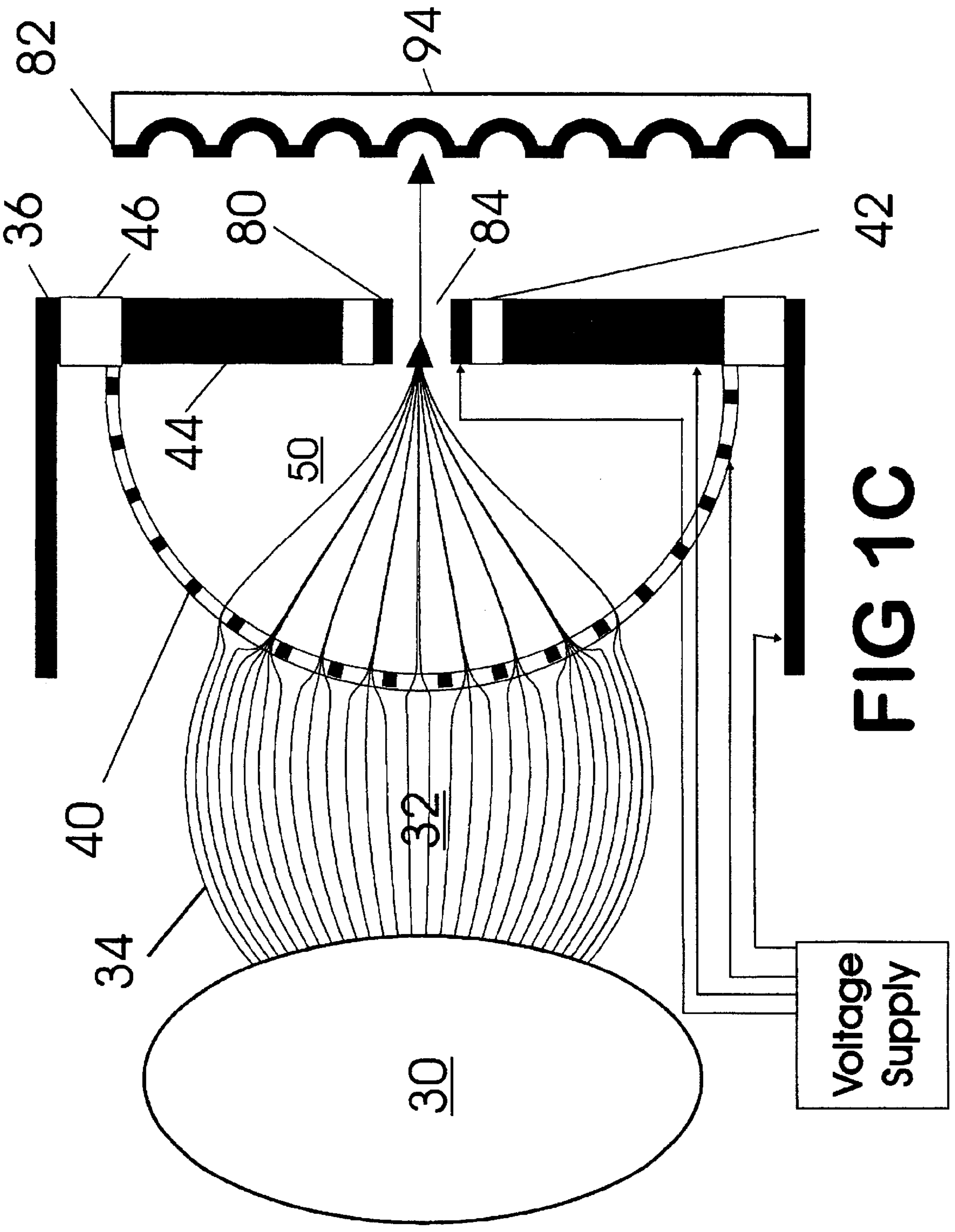

In FIG. 1C the ion and particle focusing device also shows a similar arrangement as in FIG. 1A, however, this configuration represents the collection of focused ions onto a target surface of a sample plate or probe. In this embodiment, region 90 is replaced with a collector plate 94. The focused ions at element 80 are transferred to plate 90 through a target collection aperture 84. Aperture 84 has a diameter appropriate to restrict the flow of gas from region 50 to plate 94, particularly in the case of reduced pressure ion collection. Plate 94 has the purpose of collecting ions, such as, but not limited to a 96-well plate, the collector surface 82 of which is electrically conductive. Note that the entire plate 94 could be made of conductive material negating the need for surface 82. Movement of ions from region 30 to plate 94 is indicated by a set of ion trajectory lines 34.

Figure 2A:
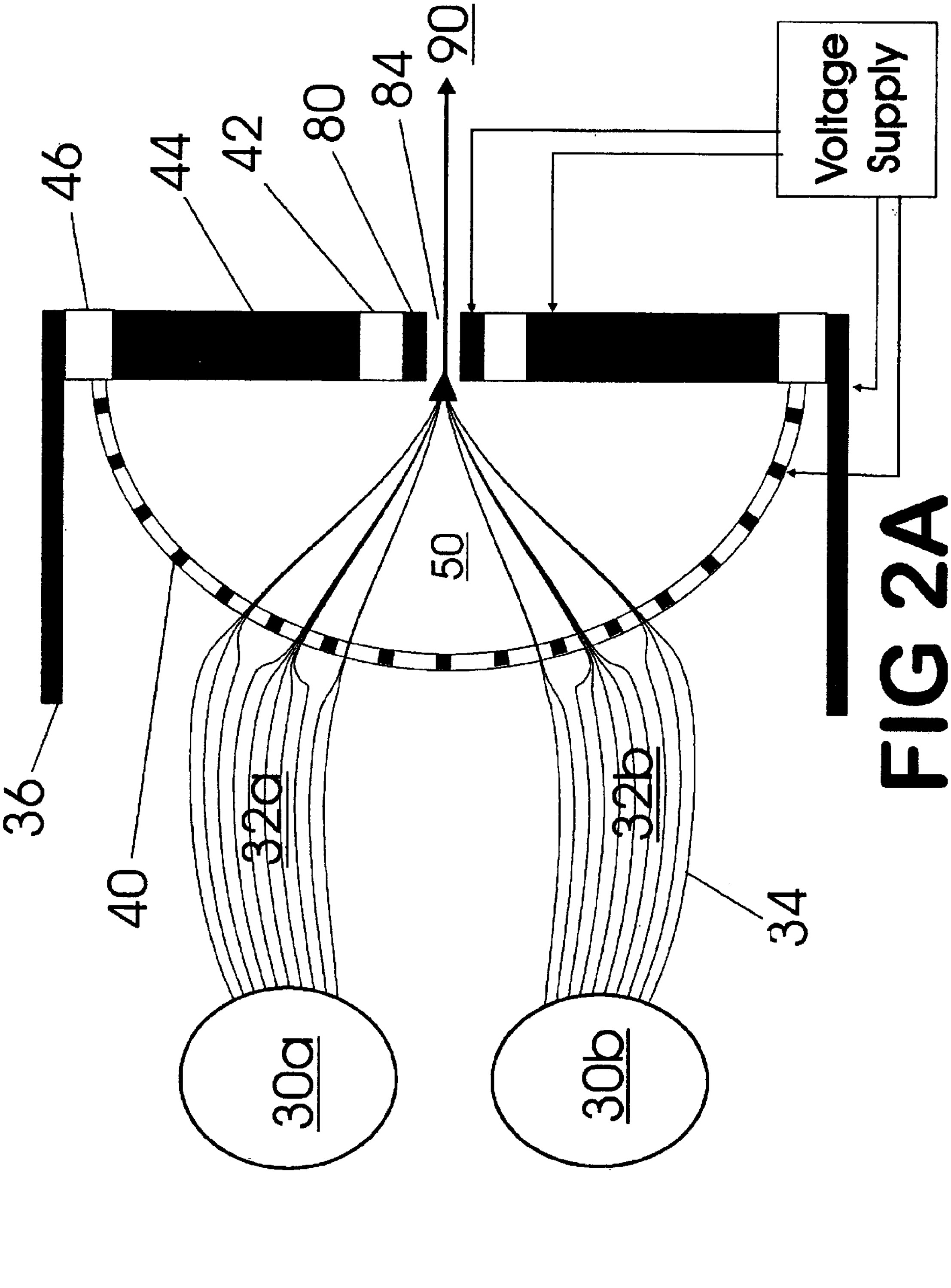
FIGS. 2 are cross-sectional illustrations of hemispherical-shaped high transmission element configurations with multiple sources of ions, (A) showing two continuous sources of ions, (B) showing time-varying or pulsed sources of ions from MALDI, and (C) showing time-varying sources of ions from electrospray.

In FIG. 2A, a single element 40 is downstream of two discrete separate ion collection regions 32*a* and 32*b* which are downstream of ion source regions 30*a* and 30*b*, respectively. Movements of ions from regions 30*a* and 30*b* to region 90 are indicated by a set of ion trajectory lines 34. This device allows the efficient sampling of two discrete ion source regions from two unique locations. Sampling of multiple ion sources is not limited to two regions; but three, four, five, or more may be sample through a single focal point (element 80).

Figure 2B:
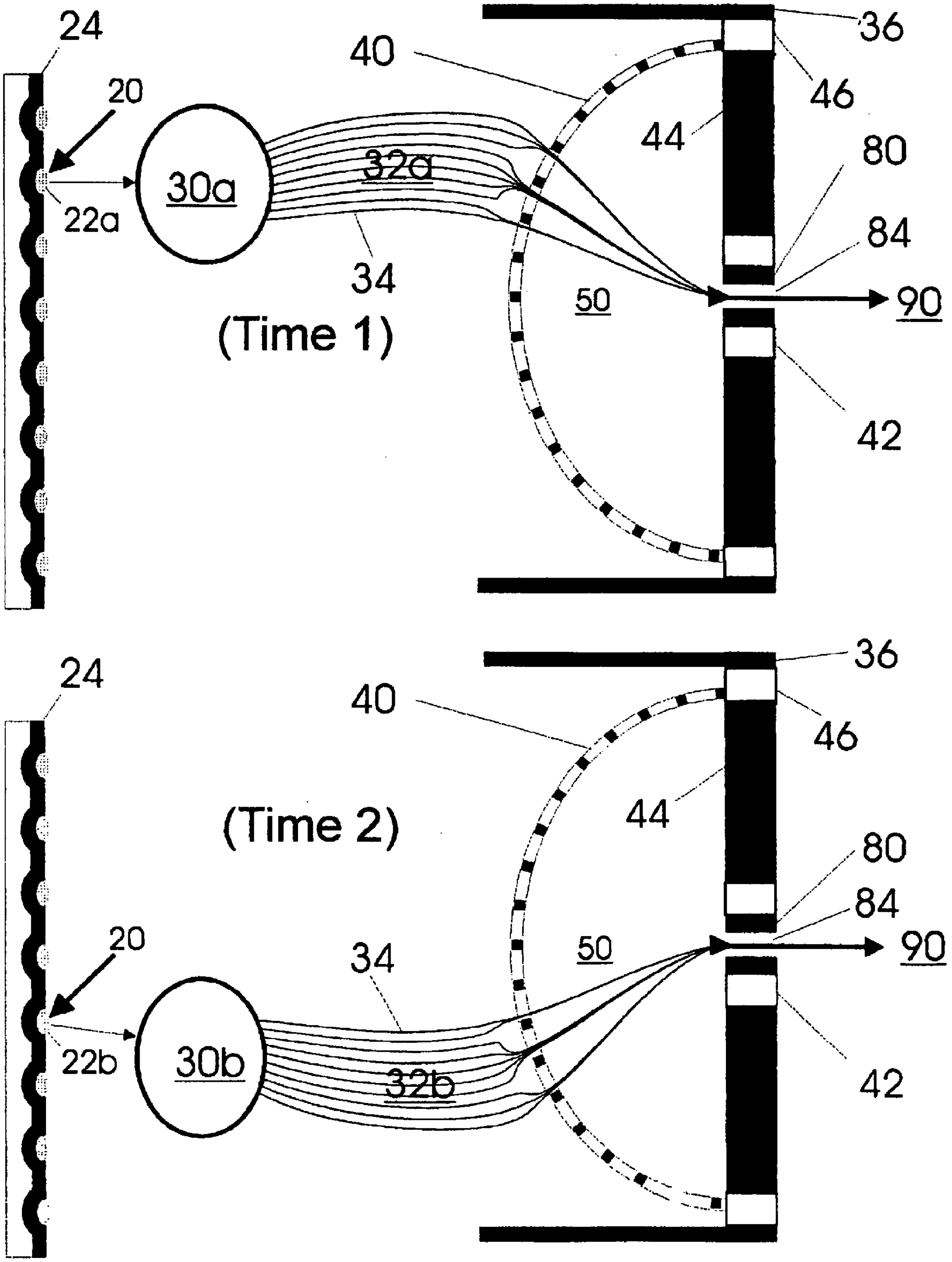

In FIG. 2B, a single element 40 is downstream of an atmospheric pressure matrix assisted laser desorption ionization (MALDI) sample plate 24, shown at two discrete ion sampling times. At (Time 1) a first sample 22*a* is illuminated by laser 20 producing desorbed ions in ion source region 30*a*. At (Time 2) a second sample 22*b* is illuminated by laser 20 producing desorbed ions in ion source region 30*b*. Ions from both regions 30*a* and 30*b* are collected across a single element 40 and passed through aperture 84 to collection or mass analysis in region 90.

Figure 2C:
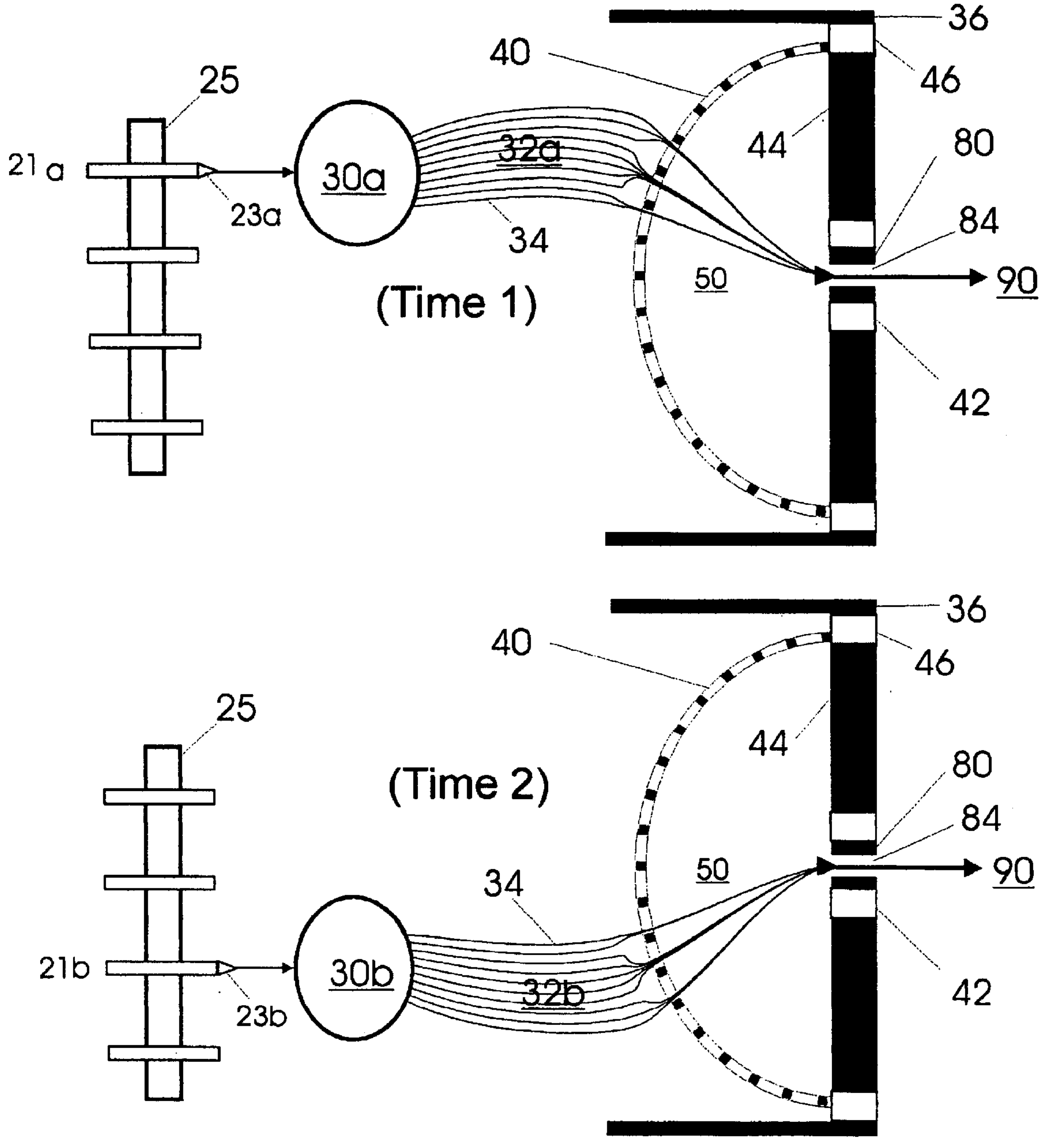

In FIG. 2C, a single element 40 is downstream of an electrospray needle array 25 at two different time points. At (Time 1) an electrospray source 21*a* forms a liquid cone-jet 23*a* and produces an aerosol of highly charged liquid droplets and ions in ion source region 30*a*. At (Time 2) a second electrospray source 21*b* forms a liquid cone-jet 23*b* producing an aerosol of highly charged liquid droplets and of ions in ion source region 30*b*. Ions from both regions 30*a* and 30*b* are collected across a single element 40 and passed through aperture 84 to collection or mass analysis in region 90.

Alternative Embodiments—FIGS. 3, 4, 5A, 5B, 6B, 6C, 6D, 7A, 7B, 7C (Ion Switching Valve, Multiple Targets, Counter-Flow Gas)

There are a variety of alternative embodiments of the present invention in terms of accommodating multiple ionization sources and multiple collectors (type and number). In addition, the device is capable of accommodating various geometries of element 40 (FIGS. 7), and accommodating a wide variety of possible aperture types for element 40 (FIGS. 6).

Figure 3A:
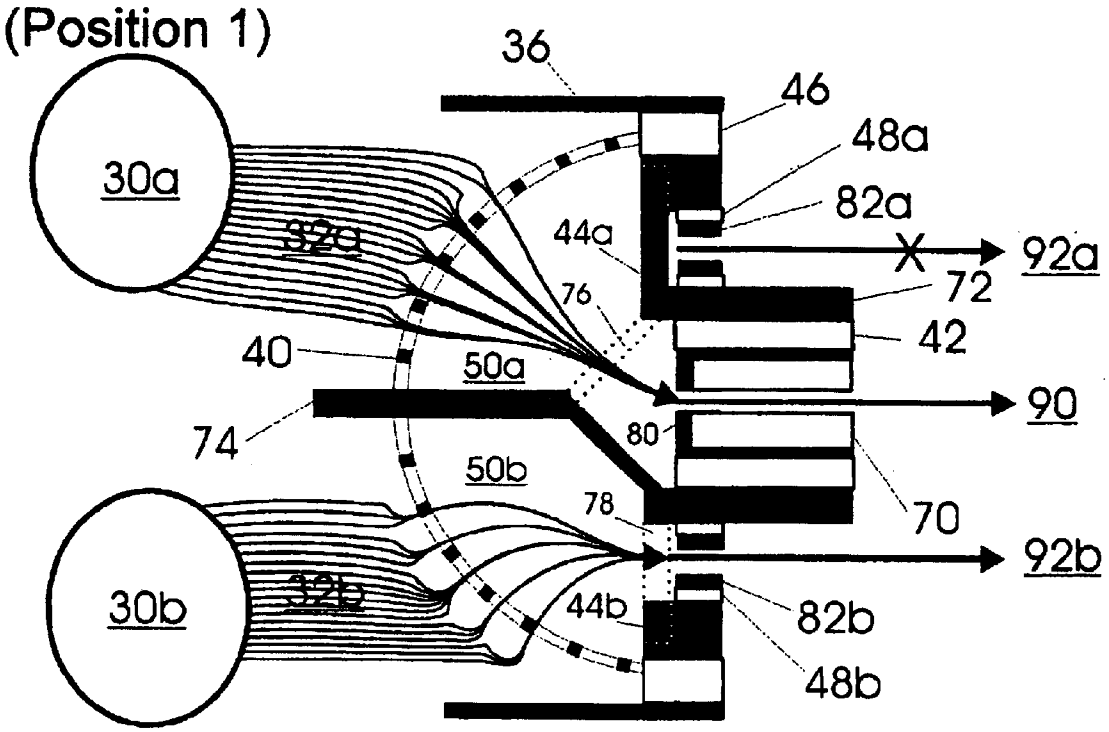
FIGS. 3 are cross-sectional illustrations of hemispherical-shaped high transmission element configurations as a rotating valve assembly for discretely sampling multiple ion sources; (A) showing valve position 1, and (B) valve position 2.
Figure 3B:
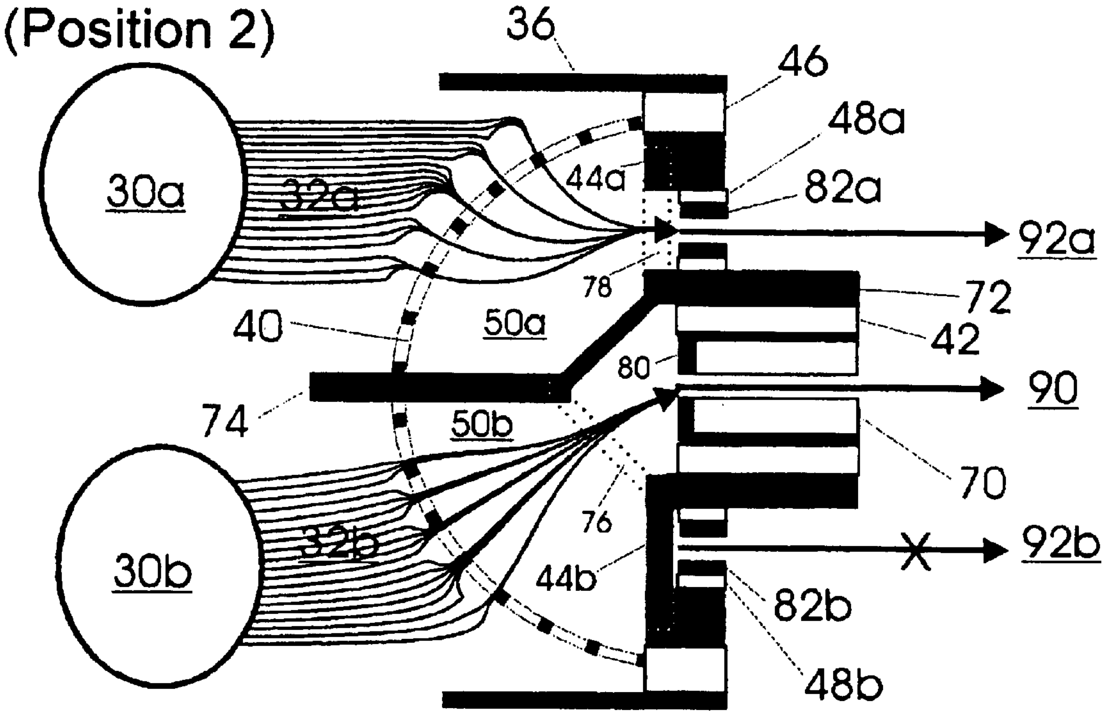

FIGS. 3 show a high efficiency atmospheric pressure focusing device operating in an ion valve-switching configuration. Here two discrete and continuous ion sources 30*a* and 30*b* are shown. Ions from each source are continually being sampled across element 40 into focusing regions 50*a* and 50*b* respectively. The hemisphere-shaped element 40 is partitioned in half by isolation plate 74 separating regions 50*a* and 50*b* and allowing ions from each source to be collected and focused uniquely. A rotating switch 72 is rotated about the axis of tube 70 to present an axial valve aperture 76 to region 50*a* and an off-axis valve aperture 78 to region 50*b* in valve (Position 1) show in FIG. 3A. Switch 72 is rotated 180° about the axis of tube 70 to present aperture 76 to region 50*b* and aperture 78 to region 50*a* in valve (Position 2) show in FIG. 3B. In valve (Position 1), ions from region 32*a* are focused toward element 80 through aperture 76 and sampled into region 90 for collection or mass detection. In this position, the ions from region 32*b* are focused toward a second off-axis collector element 82*b* through aperture 78 and collected or discarded into a second off-axis collector region 92*b*. In valve (Position 2), ions from region 32*b* are focused toward element 80 through aperture 76 and sampled into region 90 for collection or mass detection. In this position, the ions from region 32*a* are now focused toward a first off-axis collector element 82*a* through aperture 78 and collected or discarded into a first off-axis collector region 92*a*. In this embodiment, the field shaping electrodes 44*a* and 44*b* comprise the surface of the rotating switch 72. Electrode 36 is isolated from element 40 by insulator 46. Element 80 is isolated from switch 72 by insulator 42. Elements 82*a* and 82*b* are insulated from switch 72 by insulators 48*a* and 48*b*, respectively. It is the intent of FIG. 3 to illustrate a two-position ion valve switching configuration; however, four, six, eight, and larger position valves using additional off-axis valve apertures and partitioning plates will accommodate additional ionization sources for multiplexing applications. Rotation and aperture positioning would be 90°, 60°, and 45°, respectively.

Figure 4:
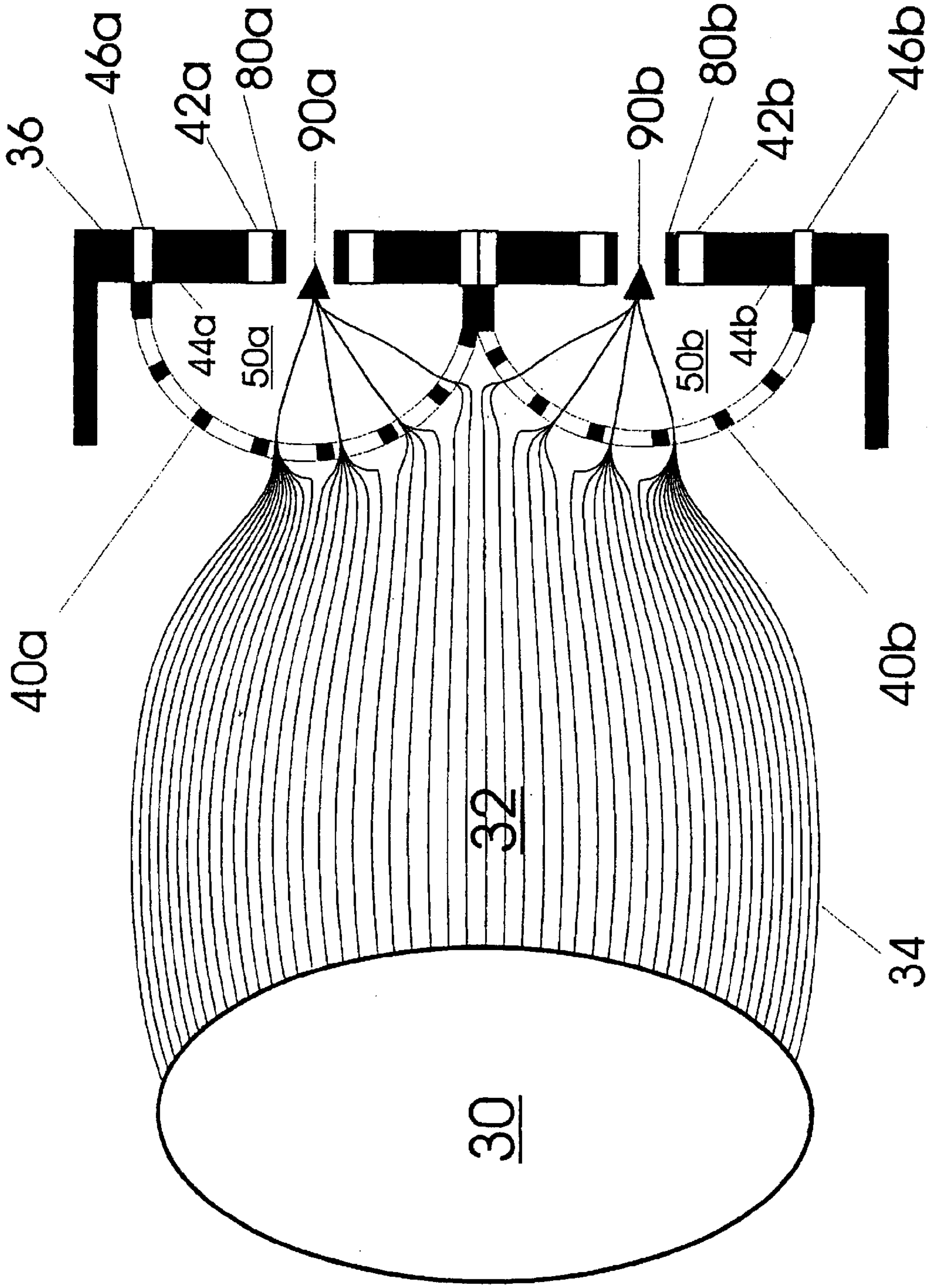
FIG. 4 is a cross-sectional illustration of a two-target array of hemispherical shaped high transmission elements sampling one source of ions.

In FIG. 4, a single source 30 supplies ions to two discrete focusing regions. Part of the ions from region 30 traverse element 40*a* and are focused in region 50*a* toward element 80*a* to collection region 90*a*. Conversely, another portion of the ions from region 32 traverse element 40*b* and are focused in region 50*b* toward element 80*b* to collection region 90*b*. The object of this embodiment is the transfer of ions to more than one target. More than one target could entail multiple detectors, one in region 90*a* and one in region 90*b*. Alternatively, there may be applications where ions (e.g. proteins, reagents) from one source may be required to be collected in two or more focal points such as the wells of multiple sample trays (e.g. 96-well plates). This device can supply efficient and real-time sample splitting for micro-collection.

Figure 5A:
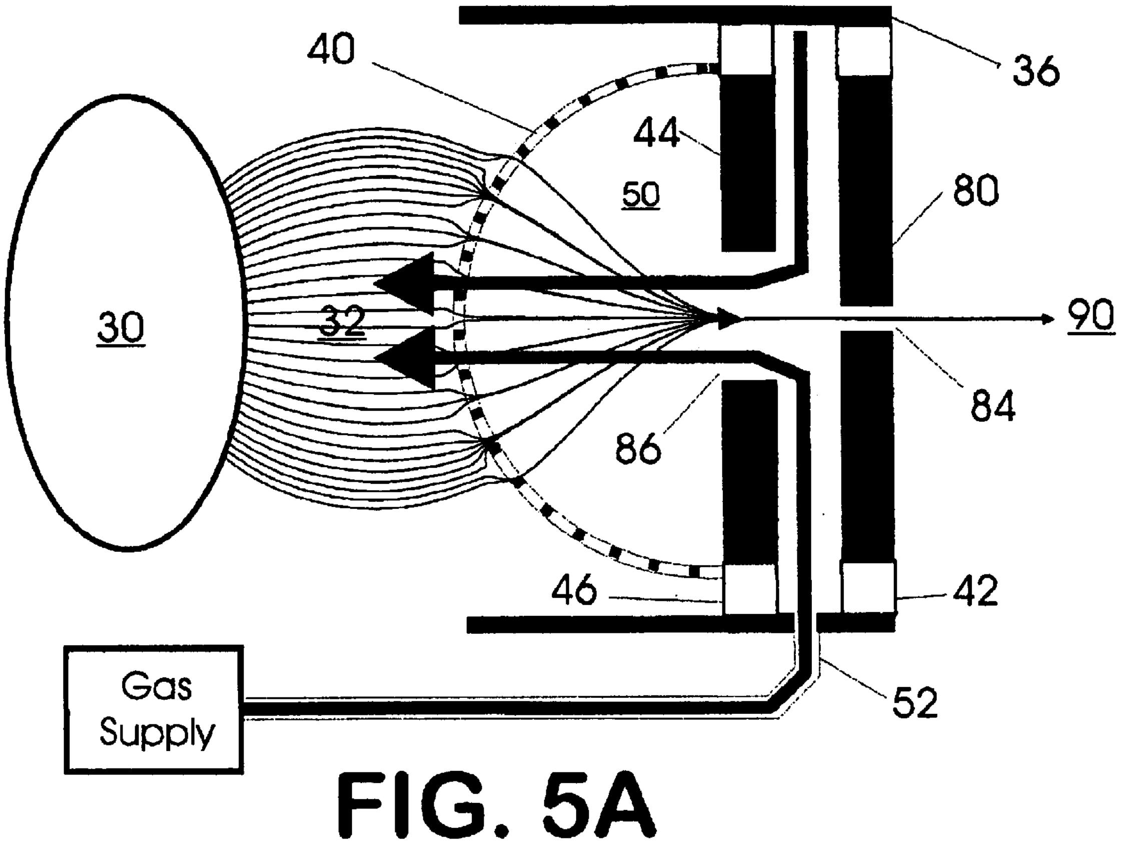
FIGS. 5 are cross-sectional illustrations of hemispherical shaped high transmission elements with a counter flow of gas; (A) showing counter-flow of gas at the target region, and (B) showing counter-flow of gas at across the entire area of the high transmission element.

In FIG. 5A the ion and particle focusing device shows a hemisphere-shaped element 40 in the same manor as FIG. 1A with the addition of a flow of gas counter to the direction of motion of ions and charged particles (trajectory lines 34). The gas is introduced from an external gas supply through tube 52 into the space between electrode 44 and element 80. The counter-flow of gas travels through an inner field-shaping electrode aperture 86, across region 50, traversing element 40 into region 32. The relative diameter of aperture 86 is significantly larger than aperture 84. The counter-flow gas is generally composed of, but not limited to nitrogen.

Figure 5B:
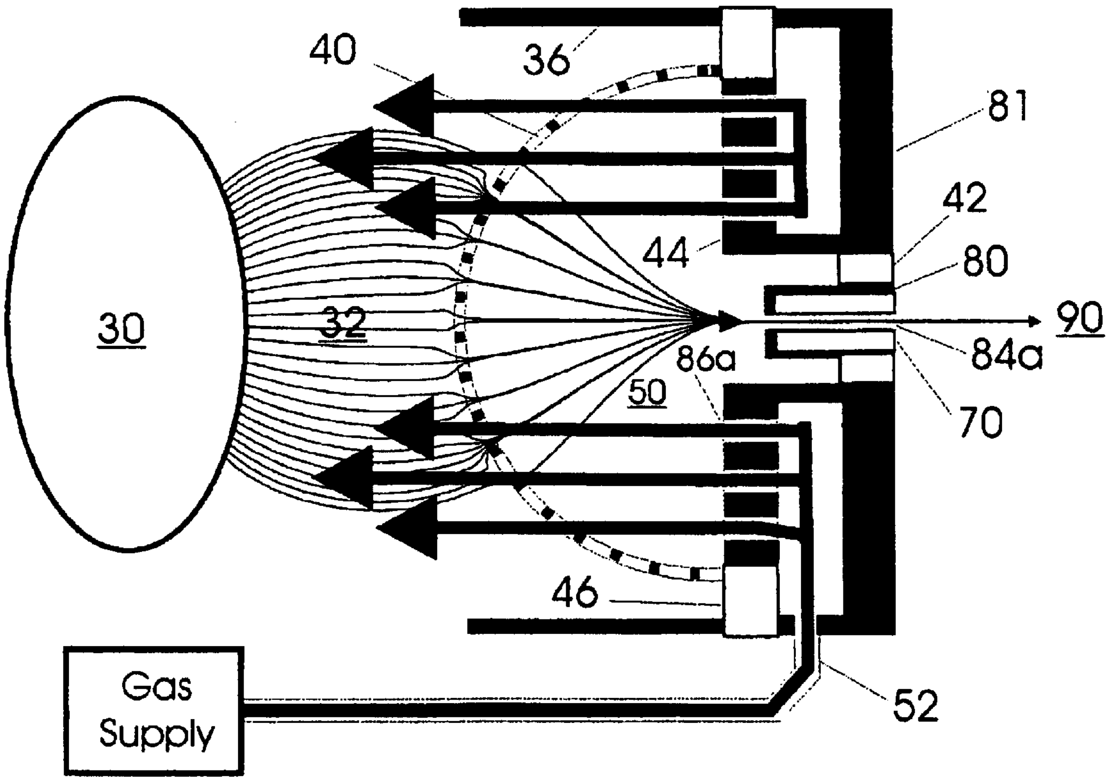

In FIG. 5B the ion and particle focusing device shows a hemisphere-shaped element 40 in the same manor as FIG. 1A with the addition of a flow of gas counter to the direction of motion of ions and charged particles. The gas is introduced from an external gas supply through tube 52 into the space between electrode 44 and element 81. The counter-flow of gas travels through an array of apertures 86*a,* across region 50, traversing element 40 into region 32. This counter-flow configuration has as an object the removal of a much broader area of interfering gases and particles. The relative diameters of apertures 86*a* are significantly larger than aperture 84*a*. The counter-flow gas is also generally composed of, but not limited to nitrogen.

Figure 6B:
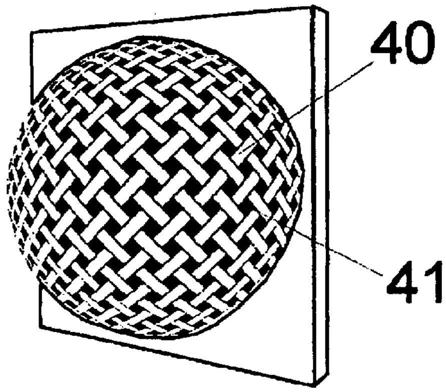
Figure 6C:
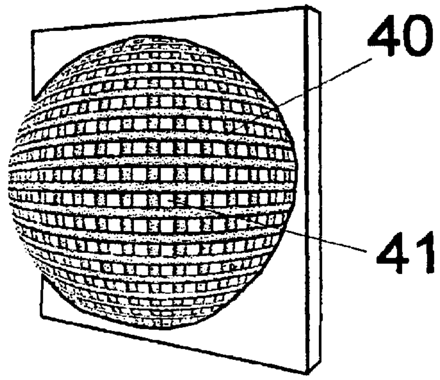
Figure 6D:
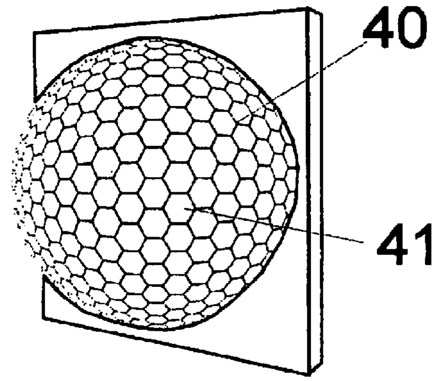
Figure 6E:
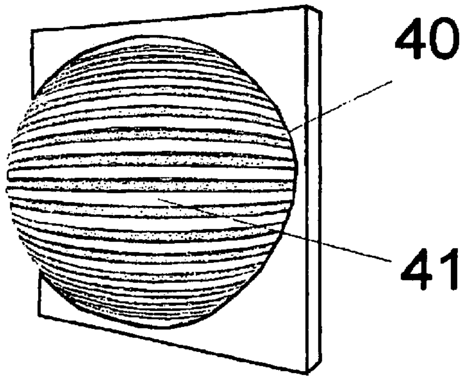

FIG. 6B shows a hemisphere-shaped element 40 made of single strands of metal wire woven to produce a pattern of square openings, commonly referred to as a plain square weave;

FIG. 6C shows a hemisphere-shaped element 40 made of two sets of single strands of metal wire with equal diameters, one set overlaying the other, producing a pattern of square openings;

FIG. 6D shows a hemisphere-shaped element 40 made of a surface with apertures 41 fabricated in a manner to produce a pattern of hexagon-shaped openings;

FIG. 6E shows a hemisphere-shaped element 40 made of a surface with transverse slotted apertures 41 across the surface.

Figure 6F:
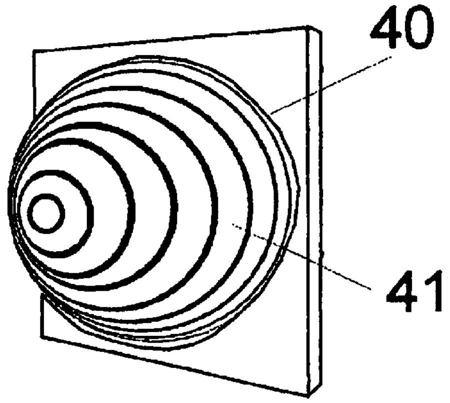

FIG. 6F shows a hemisphere-shaped element 40 made of a surface with radial slotted apertures 41 across the surface.

Figure 7A:
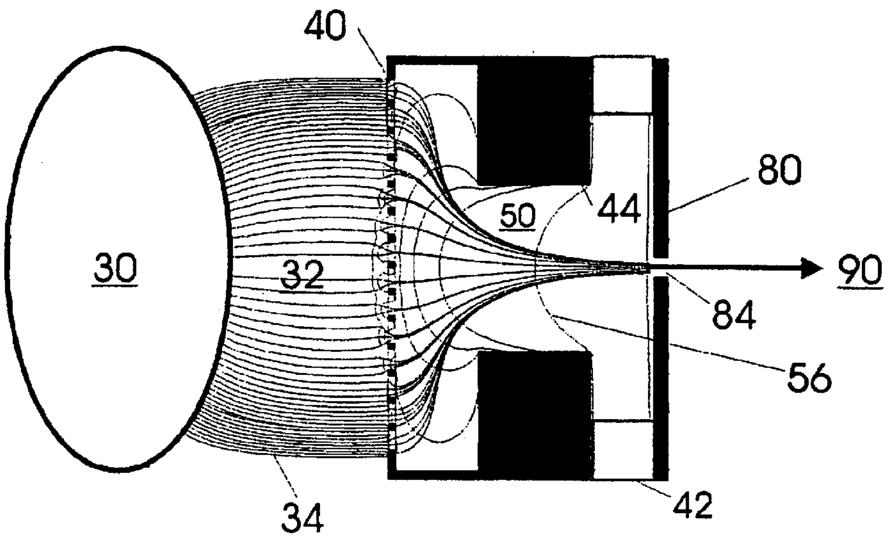
FIGS. 7 show cross-sectional illustrations various geometries of high transmission element that create effective focusing; (A) planar, (B) conical, and (C) hemispherical.
Figure 7B:
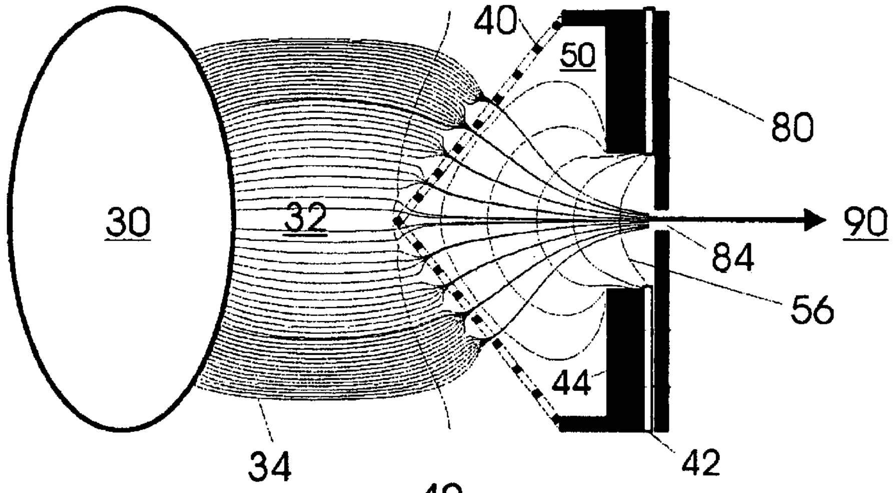
Figure 7C:
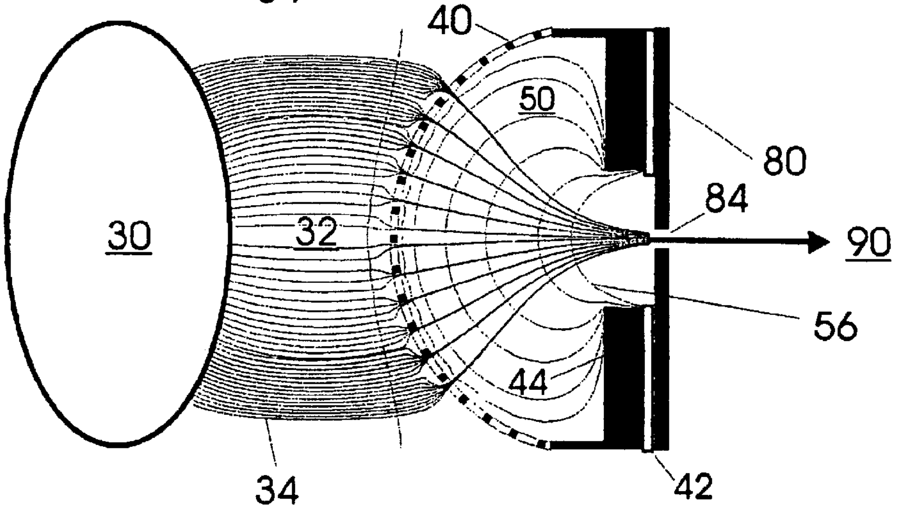

Alternatively, the element 40 may be manufactured by using the techniques of microelectronics fabrication: photolithography for creating patterns, etching for removing material, and deposition for coating the surfaces with specific materials;

FIG. 7A shows element 40 as a cross-section of a planar-shaped surface of radial slotted apertures 41 as in FIG. 6F. Element 40 is attached to the electrode 44 isolated from the planar-shaped collector element 80 by insulator 42;

FIG. 7B shows element 40 as a cross-section of a cone-shaped surface of radial slotted apertures 41 as in FIG. 6F. Element 40 is attached to the electrode 44 isolated from the planar-shaped collector element 80 by insulator 42; and FIG. 7C shows element 40 as a cross-section of a hemisphere-shaped surface of radial slotted apertures 41 as in FIG. 6F. Element 40 is attached to the electrode 44 isolated from the planar-shaped collector element 80 by insulator 42.

Operation

Operation of the Basic Device (As shown in FIGS. 1, 5, 6, and 7)

Ions supplied or generated from an atmospheric pressure source are attracted to the high transmission element 40 by an electrical potential difference between the ion source region 30 and the potential on element 40. The ions will tend to follow the field lines through region 32. We distinguish regions 30 and 32 in that the ion source region 30 may comprise a plasma with ill-defined or uncontrollable fields. Region 32 contains gas such as air or nitrogen below the threshold for discharge ionization and fields defined by the shape and potential on element 40. The ions moving toward element 40 are diverted away from the conducting surfaces of element 40 through apertures 41 by the presence of the electrical field penetrating through element 40 into the part of region 32 that is close to the outer surface of element 40. This field penetration is due to the requisite field strength on the focusing side of element 40 being larger than the field strength in region 32. The field in region 50 must be higher than that in region 32. Under conditions of a high field ratio (field in region 50/field in region 32) a significant percentage up to 100% of ions from region 32 are transferred into region 50. This effectively makes element 40 transparent to ions moving from region 32 to region 50.

The shape of element 40 and the potential difference between elements 40 and 80 will cause the ions that traversed element 40 to be focused at or near a small cross-sectional area at the center of element 80. In the operation of this device as an atmospheric inlet to the mass spectrometer, the target collection element 80 will have an aperture 84 through which focused ions will travel on their path into the vacuum system. Both focusing fields and viscous forces will cause ions in the region of aperture 84 to travel into the vacuum system of the mass spectrometer. It is intended that this focusing device be coupled to the vacuum inlet of any conventional mass spectrometer or the atmospheric pressure inlet to any ion mobility spectrometer. Alternatively, this device may be operated as a collection and focusing device to move gas-phase ions and charged particulate materials from diffuse atmospheric sources onto small focal areas of collector surfaces. We envision applications for laying down materials in printing, semiconductor, and micro-chemistry applications. In addition, this device can operate to collect sample onto surfaces for subsequent surface analysis (e.g. depositing sample onto MALDI targets, SIMS targets, or X-ray targets). In addition, collection onto surfaces of reaction wells may allow for gas-phase ion production to be a useful tool for placing charge chemical species into a discrete and small reaction well. This technique could be useful for automated collection and specification of complex reagents and reactant for applications in combinatorial chemistry.

An important alternative-operating mode of this device is illustrated in FIGS. 5. The flow of gas in a direction that is counter to the movement of ions will serve to reduce or eliminate contamination from particulate materials and neutral gases. The operation with counter-flow of gas is accomplished by adding sufficient flow to purge or remove unwanted materials. This to some extent will have some dependency on the volatility of neutral gases and the size of interfering particulate material originating from the source region 30. Lower mobility charged particles may also be swept away in the counter-flow of gas.

Operation of the of Multiple Source Devices (As shown in FIGS. 2 and 3)

The operation of the present invention will accommodate collection of ions from more than one source. The multi-source device operated under the same principles as a single-source device with the addition of more than one source of ions. Multiple sources of ions can be sampled from multiple sources derived from different locations (FIG. 2A), derived at different times (FIGS. 2B & 2C), and controlled through ion valve switching (FIGS. 3A & 3B). Ions move from their respective source toward element 40 due to the electrical potential difference between the source and element 40 creating attractive forces. High fields from region

50 penetrates the apertures of element 40 to direct the motion of the ions from regions of 32*a* and 32*b* into the respective regions of 50*a* and 50*b*. Selection of a specific source of ions to be focused can be accomplished in the time dependent manner by controlling the generation process of ions (e.g. pulse of laser, application of voltage to needle).

There may be operating modes where simultaneous collection of ions from two sources is desirable. An example would be the addition of a mass calibration standard in one source while introducing analytical sample in the other ion source. This simultaneous source application would of course have it primary application in high-resolution mass spectrometry.

There are also noteworthy alternative operating modes of multiple sources in terms of spatial orientation of the ionization source. One configuration may fix the location of the sample and collect ions from differing spatial origins such as illustrated in FIG. 2. Alternatively, the samples could be moved so that the location of ion generation is fixed and the sample is moved (e.g. move the sample plate instead of the laser beam).

An important alternative-operating mode of the multi-source embodiment of this device is found in the ion switch configuration illustrated in FIGS. 3. The switch is operated by rotating switch 72 about the axis tube 70. As switch 72 rotates, the alignment of off-axis valve aperture 78 with either element 82*a* or 82*b* will determine which direction the ions will travel in the two-source configuration. The valve is operated by switching switch 72 back and forth 180° from (Position 1) to (Position 2) thereby selecting either ion source for collection into the mass spectrometer or other collection device. The device does not require off-axis collection in either of regions 92*a* or 92*b* to be to discard or waste. There may be applications of this device where off-axis collection of diverted materials is important for isolation, purification, or other processing and analysis. The rate of rotation of switch 72 will determine the frequency of discrete sampling. High-speed sampling at many rpm will allow ion sampling at frequencies compatible with conventional chromatographic peak widths for applications in LC/MS or GC/MS. This operation of the present device within LC/MS or GC/MS would of course require that the ion source region be coupled to a chromatographic system. We envision that this is done in the wide variety of conventional configurations, which are not explicitly part of this invention.

Operation of a larger number of sources and valve ports are not illustrated in these figures but would operate in the same fashion as the two-source valve with rotating off-axis apertures spaced around a central sampling aperture.

Operation of the of Multiple Collector or Target Devices (As shown in FIG. 4)

This invention may also operate in a mode whereby the ions from a single ion source region 30 are collected and focused across multiple high transmission elements with multiple discrete collection regions. This mode is useful for delivering ions from a single source to multiple focal points. FIG. 4 shows the multi-target embodiment with only two targets, 90*a* and 90*b*. The intent of this disclosure is to describe the application of a single source ion focusing device with two or more high transmission elements and companion targets up to a large array of high transmission elements and target foci which may have application in a wide variety of applications including loading reagents onto reaction wells, printing,micro-fabrication, and semiconductor manufacture.

What is claimed is:

1. Apparatus for the collection and focusing of gas-phase ions or particles at or near atmospheric pressure, the apparatus comprising:

a. dispersive source of ions;

b. a conductive high transmission surface populated with a plurality of holes through which said ions pass unobstructed on the way to a collector target, aperture, or tube; said high transmission surface having a topside and an underside, said high transmission surface being supplied with an attracting electric potential by connection to a voltage supply, and generating an electrostatic field between said source of ions and said topside of said high transmission surface; said high transmission surface also being shaped to affect high focusing fields on the focusing side, underside, of said high transmission surface, whereby said electrostatic field at said underside of said high transmission surface is greater than said electrostatic field at said topside of said high transmission surface;

c. a target surface for receiving ions or transmitting focused ions through opening of target aperture, or tube in said target surface; said target surface held at a second ion-attracting and higher strength electric potential by connection to said voltage supply, and generating an electrostatic field between said underside of said high transmission surface and said opening of said target aperture or tube which has electrostatic field lines that are concentrated on a relatively reduced cross-sectional area of said target surface, said opening of said target aperture, or opening of said tube;

d. an inner field-shaping electrode for focusing ions exiting the underside of said high transmission surface whereby approximately all said ions are focused toward said reduced cross-sectional area on said target surface.

2. Apparatus as in claim 1 wherein said target surface comprises a conductive end of a capillary tube, wherein said capillary tube is the atmospheric or near atmospheric pressure inlet to the vacuum chamber of a mass spectrometer.

3. The apparatus of claim 1 wherein said inner field-shaping electrode is a metal electrode whereby said electrostatic potential from said target surface penetrates into a focusing region between the underside of said high transmission surface and said metal electrode through a singfe central aperture in said metal electrode.

4.The apparatus of claim 1 wherein said inner field-shaping electrode is a metal electrode held at the same potential as said high transmission surface.

5. The apparatus as in claim 1 further including an analytical apparatus in communication with said target aperture or tube in said target surface, wherein said aperture or tube is interposed between the underside of said high transmission surface and said analytical apparatus, said reduced cross-sectional area of ions being directed through said opening of said target aperture or tube into said analytical apparatus.

6. Apparatus as in claim 5 wherein said analytical apparatus comprises a mass spectrometer or ion mobility spectrometer or combination thereof.

7. Apparatus as in claim 1 wherein said gas-phase ions are formed by means of an atmospheric or near atmospheric ionization source; electrospray, atmospheric pressure chemical ionization, laser desorption, photoionization, or discharge ionization sources; or inductively coupled plasma ionization source; or a combination thereof.

8. Apparatus of claim 7 wherein said atmospheric or near atmospheric ionization source is made up of a plurality of said atmospheric or near atmospheric ion sources operated simultaneously or sequentially.

9. Apparatus of claim 1, wherein said target surface, is made up of a plurality of said focal points resulting from mechanical variations of said inner field-shaping electroders position and shape, ions or charged particles collected at said focal points, being accumulated onto said target surface for collection or passed through said opening in said target aperture or tube for analysis.

10. Apparatus in claim 1 further including a pure gas supplied between said target surface and said inner field-shaping electrodes or between said inner field-shaping electrode and said high transmission surface, whereby substantially all said gas flows into said focusing region between said inner field shaping electrode and said high-transmission surface and through said plurality of holes in said high transmission surface.

11. An apparatus in claim 1 further including an outer field-shaping electrode surrounding the circumference of said high transmission surface; said outer field-shaping electrode held at a potential the same or slightly above the potential on said high transmission surface, said outer field-shaping electrode functioning to shield topside of said high transmission surface from high electrostatic fields found in some needle containing source regions that suppress said electrostatic field penetration from said focusing region into said ion source region.

12. Apparatus for the collection and focusing of an aerosol of gas-phase charged droplets or particles at or near atmospheric pressure, the apparatus comprising:

a. a source of charged droplets or particles;

b. a conductive high transmission surface with a plurality of holes through which said aerosol of charged droplets pass, unobstructed on the way to a target surface, said high transmission surface having a topside and an underside, said high transmission surface being supplied with an attracting electrostatic potential by connection to a voltage supply, and generating an electrostatic field between said source of charged droplets, and said topside of said high transmission surface, whereby said electrostatic field at said underside of said high transmission surface is greater than said electrostatic field at said topside of said high transmission surface;

c. a target surface for receiving said charged particles, said target surface being supplied with a second ion-attracting and higher strength electrostatic potential by connection to said voltage supply, and generating an electrostatic field between said underside of said high transmission surface and said target surface whereby electrostatic field lines are concentrated to a reduced cross-sectional on said target surface;

d. an inner field-shaping electrode for focusing said charged particles exiting said underside of said high transmission surface whereby approximately all said charged droplets are focused onto said target surface.

13. The apparatus of claim 12 wherein said inner field-shaping electrode is a metal electrode whereby said electrostatic field from said target surface penetrates into a focusing region between said underside of said high transmission surface and said inner field-shaping electrode through a central aperture in said inner field-shaping electrode.

14. The apparatus of claim 12 wherein said charged droplets or particles are formed by means of atmospheric or near atmospheric pressure ionization source; electrospray, atmospheric inductive charging, discharge, or electron capture ionization sources; or combination thereof.

15. The apparatus of claim 14 wherein said atmospheric or near atmospheric ionization source is made up of a plurality of sources.

16. The apparatus of claim 12 wherein said target surface is made up of a plurality of targets whereby position and time dependence of focal points of said electrostatic field lines are determined by variation in the geometry, position, and potential of said inner field-shaping electrode.

17. A Method for the transfer of charged particles or ions from a highly dispersive area or source at or near atmospheric pressure and focusing approximately all said charged particles or ions into an inlet aperture for gas-phase ion analysis, the method comprising:

a. providing electrostatic attraction to said charged particles or ions with electrostatic fields provided by a perforated high transmission surface said perforated high transmission surface having an ion drawing potential, such that electrostatic field lines between said source of gas-phase charged particles or ions and said perforated high transmission surface are concentrated on the topside of said perforated high transmission surface;

b. transmitting said charged particles or ions through said perforated high transmission surface by allowing the unobstructed passage into a focusing region by providing a plurality of holes in said perforated high transmission surface with low depth aspect ratio, a high openness aspect ratio, and a an electrostatic potential ratio greater than one, between the underside and said topside of said perforated high transmission surface and;

c. providing electrostatic attraction to said charged particles or ions in said focusing region with a second electrostatic field generated by a target surface, said target surface having an ion-drawing potential such that electrostatic field lines between said underside of said perforated high transmission surface and an inlet aperture in said target surface are concentrated onto said target surface urging approximately all said charged particles or ions in said focusing region to be directed towards said target surface whereby approximately all said charged particles or ions flow into said inlet aperture as a reduced cross-sectional area.

18. Method as in claim 17, wherein said inlet aperture is provided at a focal point of said reduced cross-sectional area so that a substantial fraction of said charged particles or ions are transmitted to a mass spectrometer or ion mobility spectrometer or a combination thereof.

19. Method as in claim 17, further comprising providing a means for additional electrostatic focusing to said charged particles or ions in said focusing region, said additional focusing having an ion-drawing potential such that said electrostatic field lines are primarily concentrated on said inlet aperture whereby approximately all said charged particles or ions are urged into said inlet aperture in said target surface.

20. Method as in claim 17, said inlet aperture is an inlet of an atmospheric pressure interface of a mass spectrometer.

21. Method as in claim 17, further comprising providing a plurality of focal points on said target surface.

22. Method as in claim 17, wherein said inlet aperture is an inlet of an ion mobility spectrometer.

23. Method as in claim 17, further comprising providing a plurality of dispersive sources of said charged particles or ions.

24. Method as in claim 17, wherein said electrostatic potential ratio at points equidistant from the upstream or said topside surface of said high transmission surface and downstream or said underside surface of said surface of said high transmission surface is greater than 10 to 1 with said downstream (focusing side) having the greater magnitude.

25. Method as in claim 17 further comprising feeding a pure gas between said inlet aperture and said perforated high transmission surface, or between said additional electrostatic focusing means and said gas passes into said focusing region and through said plurality of holes in said perforated high transmission surface preventing larger particles from crossing said perforated high transmission surface from said source region into said focusing region.

26. Method as in claim 17, wherein said electrostatic potential ratio at points equidistant from the upstream or said topside surface of said high transmission surface and downstream or said underside surface of said high transmission surface is greater than 1 to 1 with said downstream (focusing side) having the greater magnitude.

* * * * *